(12) United States Patent
Bishop

(10) Patent No.: US 10,940,417 B1
(45) Date of Patent: Mar. 9, 2021

(54) AIR PURIFICATION SYSTEM

(71) Applicant: Joshua Bishop, Coolidge, AZ (US)

(72) Inventor: Joshua Bishop, Coolidge, AZ (US)

(*) Notice: Subject to any disclaimer, the term of this patent is extended or adjusted under 35 U.S.C. 154(b) by 7 days.

(21) Appl. No.: 16/268,725

(22) Filed: Feb. 6, 2019

(51) Int. Cl.
*B01D 46/10* (2006.01)
*F24F 13/28* (2006.01)
*B01D 46/00* (2006.01)

(52) U.S. Cl.
CPC ......... *B01D 46/0006* (2013.01); *B01D 46/10* (2013.01)

(58) Field of Classification Search
CPC ............ B01D 46/0006; B01D 46/10; B01D 2279/50; F24F 13/28; F24H 9/0052
USPC ...... 55/481, 357, 385.1, 496, 506, 510, 511, 55/DIG. 31
See application file for complete search history.

(56) References Cited

U.S. PATENT DOCUMENTS

| | | | | |
|---|---|---|---|---|
| 2,793,692 A * | 5/1957 | Horstmann | ............. | F16K 31/48 251/74 |
| 3,768,233 A * | 10/1973 | Mateson | ................ | B01D 46/10 96/1 |
| 4,713,099 A * | 12/1987 | Schroeder | ............. | B01D 46/10 55/385.1 |
| 5,944,860 A * | 8/1999 | Mack | ................ | B01D 46/0005 55/492 |
| 6,875,250 B2 * | 4/2005 | Terlson | ............. | B01D 46/0002 55/497 |
| 7,789,928 B2 | 9/2010 | Stepp | | |
| 7,811,346 B1 * | 10/2010 | Henson | ............. | B01D 46/0005 55/385.1 |
| 7,993,434 B2 * | 8/2011 | Oscar | .................... | F24F 13/085 95/273 |
| 8,157,887 B2 * | 4/2012 | Frame | ...................... | F27B 9/26 75/401 |
| 8,163,055 B2 * | 4/2012 | Chen | .................... | B01D 50/002 55/495 |
| 9,132,373 B2 * | 9/2015 | Loggins | ............ | B01D 46/0005 |
| 9,333,450 B2 | 5/2016 | Hamlin et al. | | |
| 10,434,448 B1 * | 10/2019 | Honnecke | .......... | B01D 46/0006 |

* cited by examiner

*Primary Examiner* — Minh Chau T Pham
(74) *Attorney, Agent, or Firm* — Sanchelima & Associates, P.A.; Christian Sanchelima; Jesus Sanchelima

(57) ABSTRACT

An air purification system to remove dust and other particulate matter from passing air is disclosed. The air purification system includes a housing. The housing includes a plurality of vents provided. Further, the housing includes an opening provided at a bottom of the housing. The air purification system includes a door hingedly coupled to the housing. Further, the air purification system includes an air filter removably inserted into the housing through the opening. The air filter is aligned with the plurality of vents. The door is closed to form a closed structure with the housing. The air filter is used to filter air passing through the plurality of vents and to collect dust and particulate matter. The air purification system is used as a standalone device such as forced air heating and air conditioning system or as an accessory to an existing forced air heating and air conditioning systems.

17 Claims, 2 Drawing Sheets

AIR PURIFICATION SYSTEM

BACKGROUND OF THE INVENTION

1. Field of the Invention

The present disclosure generally relates to air purification systems or air filters. More specifically, the present disclosure relates to an air purification system comprising an air filter for filtering air passing through a vent in a force air system in order to remove dust and other particulate matter from the passing air.

2. Description of the Related Art

It is known that forced air heating and air conditioning systems are used at homes and offices depending on the weather. Over a period of time, dust and particulate matters accumulate in ducts of the forced air heating and air conditioning systems. The dust and particulate matters accumulated at the forced air heating and air conditioning systems may be circulated inside house or the office while the forced air heating and air conditioning systems are being operated. The dust and particulate matters may lead to issues related to health and cleanliness for occupants of the house or the office.

In order to overcome the problem of the dust and particulate matters entering the house, typically air filters are used. Generally, these filters are affixed to the forced air heating and air conditioning systems in variety of configurations.

Some of the examples of the air filters coupled to the forced air heating and air conditioning systems have been proposed in the past. One such example is disclosed in a granted U.S. Pat. No. 7,789,928. In U.S. Pat. No. 7,789,928B2, it is disclosed that a filter assembly for mounting over an opening at an end of a forced air system duct, such as a cold air return. The filter assembly is designed to replace an existing louvered grill covering. The filter assembly is dimensioned which substantially retains the shape and appearance of the conventional duct grill being replaced. The filter assembly includes a filter frame having a perforated back wall, horizontal and vertical walls extending forwardly from the periphery of the perforated back wall defining an open front end and a filter receiving space between the perforated back wall and the open end. A rectangular grill having a peripheral flange extending rearwardly therefrom. The rectangular filter frame being received interiorly of the peripheral flange. A filter element being removably seated within the filter receiving space and being sandwiched between the perforated back wall and the grill causing the entire surface of the filter element to substantially contact the perforated back wall.

Another example is disclosed in a granted U.S. Pat. No. 6,241,794. In U.S. Pat. No. 6,241,794B1, a minivent air filter for filtering air passing through a vent in a force air system to remove dust and other particulate matter from the passing air is disclosed. The minivent air filter includes a vent cover and a tubular vent sleeve in communication with the vent cover. The vent sleeve has an elongate slot. A pair of support rails is disposed in the vent sleeve below the elongate slot. A filter is inserted through the elongate slot into the vent sleeve.

Another example is disclosed in a granted U.S. Pat. No. 9,333,450. In U.S. Pat. No. 9,333,450B2, it is disclosed that a combination filter and register for a heating, ventilation, and air conditioning system includes a register mounted in a structure and a filter. The register includes a plurality of parallel blades and a plurality of vane members, with a space defined between the two. The register does not have a dedicated access opening. The filter includes a pliable rectangular frame with a pliable filter material spanning it. The pliable filter material and pliable frame allow the filter to be inserted between two of the plurality of parallel blades, or between one of the parallel blades and an edge of the register, for placement of the filter into the space between the blades and the vanes without removing the register from the structure in which it is mounted.

Although the above disclosures discussed are capable of removing dust and other particulate matter from the passing air, they have few problems. As known, the filters need to be removed from the air conditioning system for cleaning. However, due to their construction, it is difficult to remove the filter as they take considerable time and effort.

Other documents describing the closest subject matter provide for a number of more or less complicated features that fail to solve the problem in an efficient and economical way. None of these patents suggest the novel features of the present invention. Specifically, none of the disclosures in the art disclose an air purification system comprising an air filter for filtering air passing through a vent in a force air system, in which the air purification system is provided with a mechanism to remove or replace the filter.

Therefore, there is a need to provide an air purification system comprising a mechanism to easily remove or replace an air filter.

SUMMARY OF THE INVENTION

It is one of the main objects of the present invention to provide an air purification system to remove dust and other particulate matter from passing air and that avoids the drawbacks of the prior art.

It is one object of the present invention to provide an air purification system that can be used as a standalone device such as forced air heating and air conditioning system or as an accessory to an existing forced air heating and air conditioning systems to remove dust and other particulate matter from the passing air.

It is one object of the present invention to provide an air purification system comprising a housing. The housing comprises a plurality of vents provided. Further, the housing comprises an opening provided at bottom of the housing. The air purification system comprises a door hingedly coupled to the housing. Further, the air purification system comprises an air filter removably inserted into the housing through the opening. The air filter is aligned with the plurality of vents. The door is closed to form a closed structure with the housing. The air filter is used to filter air passing through the plurality of vents and to collect dust and particulate matter.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

The following detailed description is intended to provide example implementations to one of ordinary skill in the art, and is not intended to limit the invention to the explicit disclosure, as one or ordinary skill in the art will understand that variations can be substituted that are within the scope of the invention as described.

The present disclosure discloses an air purification system to remove dust and other particulate matter from passing air. The air purification system comprises a housing. The housing comprises a plurality of vents provided. Further, the housing comprises an opening provided at bottom of the housing. The air purification system comprises a door hingedly coupled to the housing. Further, the air purification system comprises an air filter removably inserted into the housing through the opening. The air filter is aligned with the plurality of vents. The door is closed to form a closed structure with the housing. The air filter is used to filter air passing through the plurality of vents and to collect dust and particulate matter.

The air purification system is used as a standalone device such as forced air heating and air conditioning system or as an accessory to an existing forced air heating and air conditioning systems.

Figure 1:
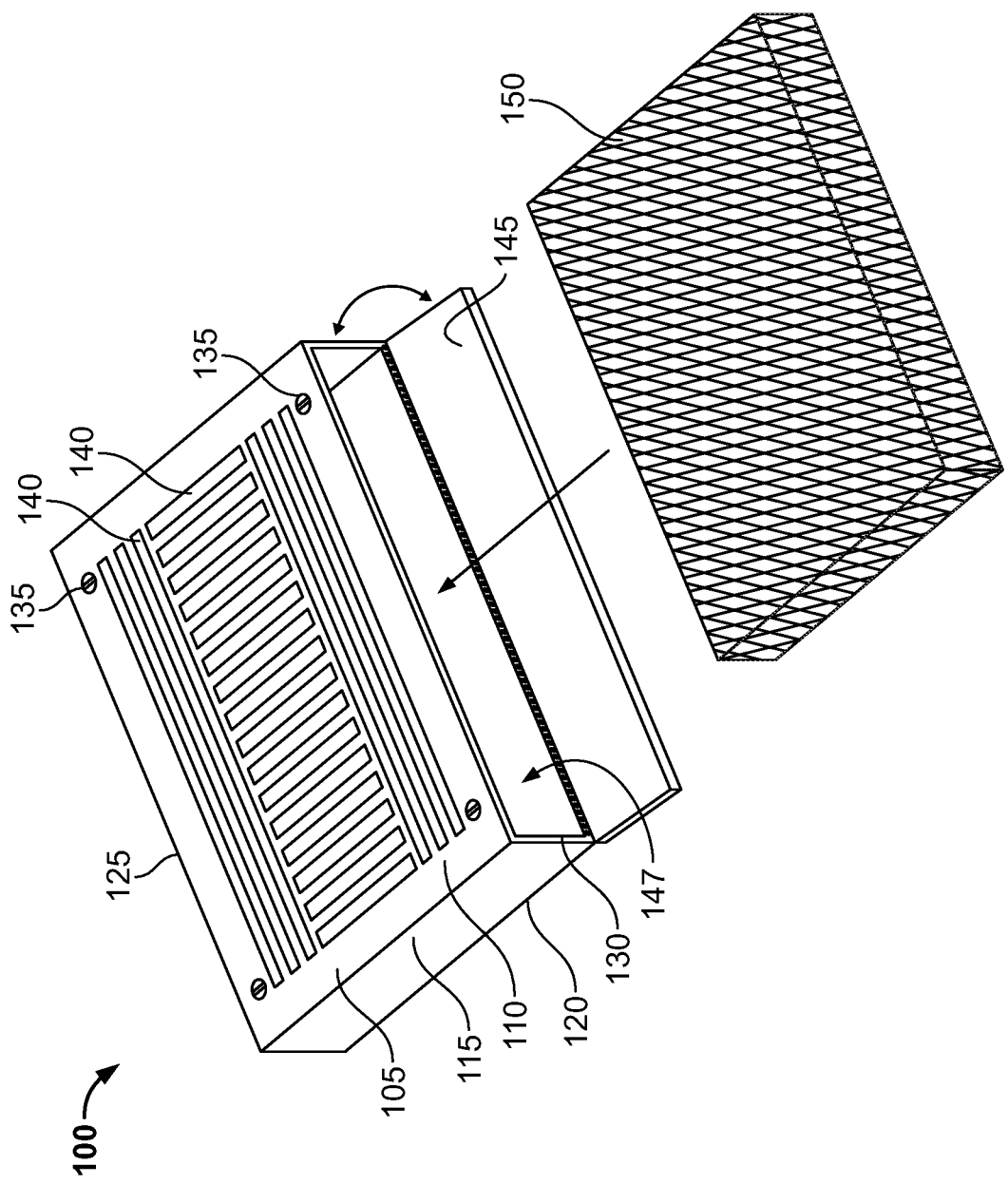
FIG. 1 illustrates an air purification system 100 comprising an air filter 150, in accordance with one embodiment of the present disclosure.
Figure 2:
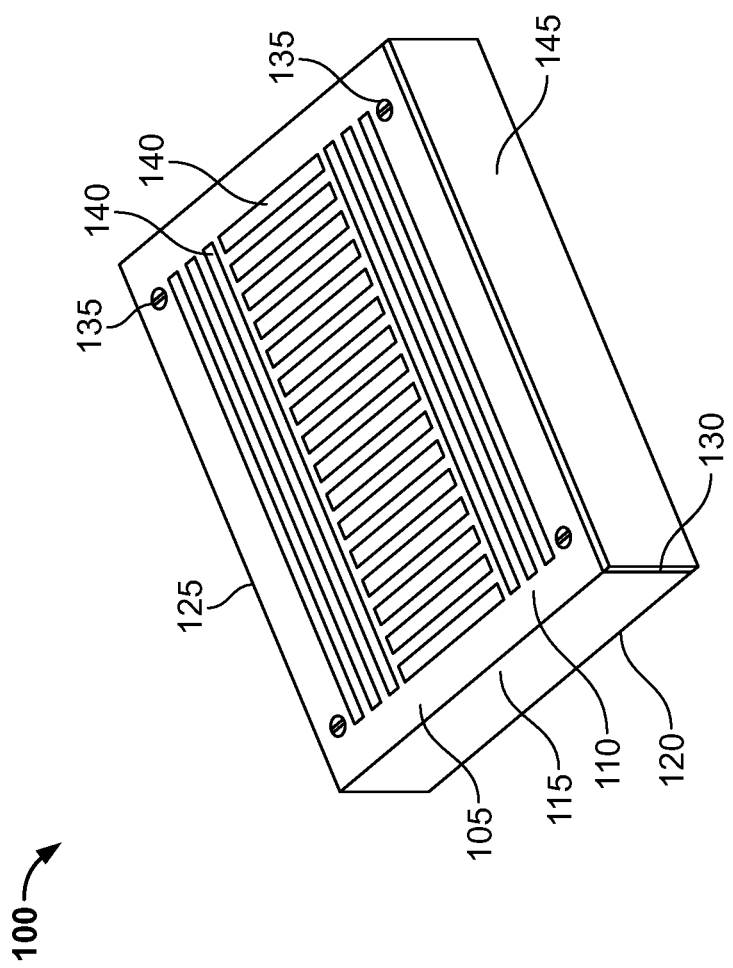
FIG. 2 illustrates the air purification system 100 in closed position, in accordance with one embodiment of the present disclosure.

Various features and embodiments of an air purification system are explained in conjunction with the description of FIGS. 1-2.

Referring to FIG. 1, an air purification system 100 is shown, in accordance with one embodiment of the present disclosure. The air purification system 100 comprises a housing 105 made up of wood, metal, plastic and any other suitable material. The housing 105 may be provided in square, rectangular or any other shape. The housing 105 comprises a front portion 110, side portions 115, a rear portion 120, a top portion 125 and a bottom 130. It should be understood the front portion 110, the side portions 115, the rear portion 120, the top portion 125 and the bottom 130 are affixed using screws 135 or any other known mechanism such as welding.

It should be understood that the air purification system 100 might indicate a forced air heating or air conditioning system or an accessory attached to one of the forced air heating and air conditioning systems. As such, the air purification system 100 may include a plurality of vents 140 at the front portion 110. As can be seen in FIG. 1, the plurality of vents 140 may be provided either in vertical or horizontal configuration. However, it is obvious to provide the plurality of vents 140 in various other configurations. It should be understood that if the air purification system 100 is used as a forced air heating or air conditioning system, then the plurality of vents 140 might be provided at the front portion 110 and the rear portion 120 of the housing 105. It should be understood that the plurality of vents 140 might be used to draw air into the housing 105.

Further, at the bottom 130, the housing 105 may be provided with a door 145 hingedly coupled at the bottom 130. The door 145 is hingedly operated, as such when the door 145 is opened; the door 145 creates an opening 147 as shown in FIG. 1. Although it is shown the opening 147 is formed entirely at the bottom 130 of the housing 105, alternatively it is possible to cut a portion of the bottom 130 to form a slot (not shown) through the bottom 130 thereby forming the opening 147 only in a small portion or size at the bottom 130.

Further, the air purification system 100 comprises an air filter 150. The air filter 150 may be provided in square or rectangular in shape. The air filter 150 might be chosen having a length and width similar to the plurality of vents 140 provided at the front portion 110 such that the air passing through the plurality of vents 140 is made to pass through the air filter 150. It should be understood that the air filter 150 is removably inserted into the housing 105 through the opening 147 formed at the bottom 130. If the slot is formed at the bottom 130, then the air filter 150 is inserted into the housing 105 through the slot. In one implementation, the air filter 150 may be made up of an unwoven fabric or polyester. However, it is obvious to a person skilled in the art to use other filter mediums such as paper or felt as substitutes and such implementations are within the scope of the present disclosure.

Now referring to FIG. 2, the air filter 150 inserted into the housing 105 is shown, in accordance with one embodiment of the present disclosure. After inserting the air filter 150 into the housing 105, the air filter 150 is positioned in alignment with the plurality of vents 140 and the air filter 150 may be held in place with the help of fasteners or any other known mechanism. Subsequently, the door 145 is closed using known mechanisms preferably using a snap mechanism. Due to the snap mechanism, a user may easily open the door 145 in order to insert or remove the air filter 150 from the housing 105.

The user may remove the air filter 150 from the housing 105 in order to clean the air filter 150 or to replace another air filter 150 into the housing 105. This way, the user can avoid dust and particulate matters accumulation at the air filter 150. Further, by regularly cleaning or replacing the air filter 150, the user can prevent dust and particulate matters entering the house. This is because; the air filter 150 filters air passing through plurality of vents 140 and removes dust and other particulate matter from the passing air. The air filter 150 may be cleaned or replaced as may be needed e.g., the air filter 150 may be cleaned or replaced once in a week or month.

Based on the above, it is evident that the air purification system can be used as a standalone device such as forced air heating and air conditioning systems or as an accessory to an existing forced air heating and air conditioning systems in order to filter air that is passing through the vents. The present disclosure presents an easier mechanism of inserting or taking out the air filter by sliding in and out of the housing through the opening or slot provided at the bottom.

Although the present disclosure is explained considering that the opening or slot is provided at the bottom of the housing to insert the air filter, it is understood that the air filter might also be inserted into the housing through an opening or slot provided either at one or both side portions or at the top portion of the housing.

Further, with respect to the above description, it is to be noted that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An air purification system, comprising:
   a housing;
   a plurality of vents provided at the housing, said plurality of vents further defined as vertical vents and horizontal vents, said vertical vents being evenly spaced apart and parallel to each other, said horizontal vents being evenly spaced apart and parallel to each other, said vertical vents extending partially along a width of said housing, said horizontal vents extending partially along a length of said housing, said horizontal vents are further defined by a first set and a second set, said vertical vents sandwiched between said first set and said second set, said first set being entirely above of said vertical vents, said second set being entirely below said vertical vents, said vertical vents extend a length of each of said first set and second set simultaneously, said vertical vents being identical to each other, said horizontal vents being identical to each other;
   an opening provided at the housing, said opening extending entirely along the length of said housing;
   a door hingedly coupled to the housing selectively covering said opening entirely; and
   an air filter removably inserted into the housing through the opening, said air filter being concealed entirely within said housing, wherein the air filter is aligned with the plurality of vents, wherein the door is closed to form a closed structure with the housing, and wherein the air filter is used to filter air passing through the plurality of vents and to collect dust and particulate matter.

2. The air purification system of claim 1, wherein the opening is provided at a bottom of the housing.

3. The air purification system of claim 1, wherein the opening is provided at side portions of the housing.

4. The air purification system of claim 1, wherein the opening is provided at a top portion of the housing.

5. The air purification system of claim 1, wherein the air filter is positioned with the help of fasteners.

6. The air purification system of claim 2, wherein the opening is formed by cutting a portion of the bottom.

7. The air purification system of claim 1, wherein said housing includes a height, said length being greater than said height.

8. The air purification system of claim 1, wherein said vertical vents are perpendicular to said horizontal vents.

9. The air purification system of claim 1, wherein said vertical vents extend between said horizonal vents.

10. The air purification system of claim 1, wherein said plurality of vents are centrally located on said housing, a spacing defined between said plurality of vents and peripheral edges of said housing.

11. The air purification system of claim 1, wherein a door hinge is mounted to said door to hingedly couple the door to the housing, said door hinge extending entirely along said length of said housing and entirely along a door length.

12. The air purification system of claim 1, wherein said vertical vents are all of a same length and width.

13. The air purification system of claim 1, wherein said horizontal vents are all of a same length and width.

14. The air purification system of claim 1, wherein said housing is secured together with screws, said screws being adjacent to said horizontal vents.

15. The air purification system of claim 1, wherein said door is closed using a snap mechanism.

16. The air purification system of claim 1, wherein said opening is wider than said horizontal vents.

17. An air purification system, consisting of:
   a housing, said housing defined by a top portion, a rear portion, side portions and a front portion which are secured together with screws;
   a plurality of vents provided at the housing on said front portion, said plurality of vents further defined as vertical vents and horizontal vents, said vertical vents being evenly spaced apart and parallel to each other, said horizontal vents being evenly spaced apart and parallel to each other, said vertical vents extending partially along a width of said housing, said horizontal vents extending partially along a length of said housing, said vertical vents having a same length and width as one another, said horizontal vents having a same length and width as one another, said horizontal vents further defined as a first set and a second set, said vertical vents being sandwiched between said first set and said second set, said first set being entirely above of said vertical vents, said second set being entirely below said vertical sets, said vertical vents extending a length of said first and second set of horizontal vents simultaneously;
   an opening provided at a bottom of the housing, said opening extending entirely along the length of said housing;
   a door hingedly coupled to the housing selectively covering said opening entirely when said door is lifted towards said top portion; and
   an air filter removably inserted into the housing through the opening, said air filter concealed within housing, wherein the air filter is aligned with the plurality of vents, wherein the door is closed to form a closed structure with the housing, and wherein the air filter is used to filter air passing through the plurality of vents and to collect dust and particulate matter.

* * * * *